US012640394B2

(12) United States Patent
Cui et al.

(10) Patent No.: US 12,640,394 B2

(45) Date of Patent: May 26, 2026

(54) POLYOXYMETHYLENE-BASED ALL-SOLID-STATE POLYMER ELECTROLYTE PREPARED BY IN-SITU RING-OPENING POLYMERIZATION AND APPLICATION

(71) Applicant: QINGDAO INSTITUTE OF BIOENERGY AND BIOPROCESS TECHNOLOGY, CHINESE ACADEMY OF SCIENCES, Qingdao (CN)

(72) Inventors: Guanglei Cui, Qingdao (CN); Jianjun Zhang, Qingdao (CN); Han Wu, Qingdao (CN); Tingting Liu, Qingdao (CN); Jinning Zhang, Qingdao (CN); Ben Tang, Qingdao (CN); Zhe Yu, Qingdao (CN); Hongxia Xu, Qingdao (CN)

(73) Assignee: QINGDAO INSTITUTE OF BIOENERGY AND BIOPROCESS TECHNOLOGY, CHINESE ACADEMY OF SCIENCES, Qingdao (CN)

(*) Notice: Subject to any disclaimer, the term of this patent is extended or adjusted under 35 U.S.C. 154(b) by 860 days.

(21) Appl. No.: 17/808,906

(22) Filed: Jun. 24, 2022

(65) Prior Publication Data

US 2022/0328873 A1 Oct. 13, 2022

Related U.S. Application Data

(63) Continuation-in-part of application No. PCT/CN2020/074805, filed on Feb. 12, 2020.

(30) Foreign Application Priority Data

Dec. 25, 2019 (CN) ........................ 201911357076.9

(51) Int. Cl.

| | |
|---|---|
| ***H01M 10/0565*** | (2010.01) |
| ***C08G 61/12*** | (2006.01) |
| ***H01M 10/052*** | (2010.01) |

(52) U.S. Cl.

CPC ...... *H01M 10/0565* (2013.01); *C08G 61/122* (2013.01); *H01M 10/052* (2013.01); *H01M 2300/0082* (2013.01)

(58) Field of Classification Search

None

See application file for complete search history.

(56) References Cited

U.S. PATENT DOCUMENTS

| | | | |
|---|---|---|---|
| 4,578,326 | A | 3/1986 | Armand et al. |
| 4,792,504 | A | 12/1988 | Schwab et al. |
| 2019/0058215 | A1 | 2/2019 | Dai et al. |

FOREIGN PATENT DOCUMENTS

| | | | |
|---|---|---|---|
| CN | 1428363 | A | 7/2003 |
| CN | 105826603 | A | 8/2016 |

(Continued)

OTHER PUBLICATIONS

Feng et al., "Role of dinitrile plasticizer chain lengths in electrochemical performance of highly conductive polymer electrolyte membrane for lithium ion battery", Electrochimica Acta 330, 135320, Nov. 2019 (Year: 2019).*

(Continued)

*Primary Examiner* — Niki Bakhtiari
*Assistant Examiner* — James A Corno
(74) *Attorney, Agent, or Firm* — NKL Law; Allen Xue

(57) ABSTRACT

A polyoxymethylene-based all-solid-state polymer electrolyte prepared by in-situ ring-opening polymerization is used in forming an all-solid-state secondary lithium battery. A trioxymethylene monomer, an additive and lithium salt initiates in-situ ring-opening polymerization on a porous (Continued)

Transparent and dissolution　Translucent　Starting polymerization　Complete polymerization support material through a catalyst to form the all-solid-state polymer electrolyte, which has a thickness of 10 μm-800 μm, an ionic conductivity of $4\times10^{-5}$ S/cm–$8\times10^{-3}$ S/cm at room temperature and an electrochemical window not lower than 4.2 V.

6 Claims, 4 Drawing Sheets

(56) References Cited

FOREIGN PATENT DOCUMENTS

| | | | | | |
|---|---|---|---|---|---|
| CN | 106410269 | A | | 2/2017 | |
| CN | 107342436 | A | | 11/2017 | |
| CN | 109103488 | A | * | 12/2018 | ............ C08G 65/08 |
| EP | 2667443 | A1 | | 11/2013 | |
| IN | 101183727 | A | | 5/2008 | |

OTHER PUBLICATIONS

Lu et al., "Electrolyte and Interface Engineering for Solid-State Sodium Batteries," Joule 2(19), pp. 1747-1770, Sep. 2018 (Year: 2018).*
Zhu et al., "Understanding glass fiber membrane used as a novel separator for lithiumâsulfur batteries", Journal of Membrane Science 504, pp. 89-96, Apr. 2016 (Year: 2016).*
CN-109103488-A machine translation (Year: 2018).*
Lv et al. ("Robust Succinonitrile-Based Gel Polymer Electrolyte for Lithium-Ion Batteries Withstanding Mechanical Folding and High Temperature," ACS Applied Materials and Interfaces 10, pp. 25384-25392, Jul. 2018) (Year: 2018).*
Zhao et al. ("Solid-state polymer electrolytes with in-built fast interfacial transport for secondary lithium batteries," Nature Energy 4, pp. 365-373, Mar. 2019) (Year: 2019).*

* cited by examiner

POLYOXYMETHYLENE-BASED ALL-SOLID-STATE POLYMER ELECTROLYTE PREPARED BY IN-SITU RING-OPENING POLYMERIZATION AND APPLICATION

TECHNICAL FIELD

The present disclosure relates to an all-solid-state polymer electrolyte, in particular to a polyoxymethylene-based all-solid-state polymer electrolyte prepared by in-situ ring-opening polymerization and an application thereof in forming an all-solid-state secondary lithium battery.

BACKGROUND

For lithium batteries used in application scenarios of an electric vehicle or a mobile intelligent device, safety performance is very important, in addition to satisfying the requirements of long cruising range, high-power charging and discharging and long stand-by time. At present, when a lithium battery based on liquid electrolyte is misused, short-circuited, or used in extreme conditions, a lot of heat will be released inside the battery due to contact between the cathode and the anode, which will ignite organic electrolytes, resulting in serious potential safety hazards such as fire and explosion and causing a great threat to user safety and happiness experience. Therefore, the safety performance of the lithium battery based on liquid electrolyte needs to be improved urgently in order to achieve wider application. Even American Tesla cars, which are currently considered as the safest, use a complex battery management system and protective measures, and still have many fire and explosion accidents of the electric vehicle within a few short years from appearance. In addition, the problems of the organic electrolytes include: an electrochemical window is limited and is difficult to be compatible with lithium metal anodes and newly developed high-voltage cathode materials; lithium ions are not the only carriers; when large current passes, internal resistance of the battery will be sharply increased due to appearance of an ion concentration gradient (concentration polarization), causing that the battery performance is decreased; operating temperature is limited (safe operating temperature is 10° C.-50° C.); and the organic electrolyte reacts with anode material to produce a solid electrolyte interphase (SEI) layer, which causes the continuous consumption of active lithium and the electrolyte and the continuous decay of battery capacity. Replacing the organic liquid electrolytes with solid-state electrolytes is expected to fundamentally solve the above-mentioned problems, and the lithium battery formed in this way is called as a solid-state lithium battery.

The solid-state secondary lithium batteries mainly include two categories according to the solid electrolytes: one category refers to the lithium battery composed of solid-state polymer electrolytes, which is also called a solid-state polymer lithium battery; and the other category refers to the lithium battery composed of inorganic solid electrolytes, which is also called a solid-state inorganic lithium battery. In polymer electrolytes, the matrix material of the polymer mainly includes polyethylene oxide, polycarbonate, poly(vinylidene fluoride), polyacrylonitrile, polymethylmethacrylate and poly(vinylidene chloride). Examples of disclosed polymer electrolytes are as follows: U.S. Pat. No. 4,792,504 describes a polymer electrolyte which contains poly(ethylene glycol dimethacrylate/polyethylene oxide), but the mechanical performance thereof is not high. CN200710144760 describes a polymer electrolyte with ultrafine powder filler added to polyethylene oxide, which has good mechanical performance but low ionic conductivity. CN1428363A describes a nanoporous polymer electrolyte membrane, which has excellent charge/discharge performance and cycle performance. However, the polymer electrolyte membranes involved in the above patents have relatively good properties, but both are gel polymer electrolytes. CN105826603 A describes an in-situ polymerized vinylene carbonate-based solid-state polymer electrolyte system and application thereof, which have excellent mechanical properties, but the solid-state polymer electrolyte has low ionic conductivity at room temperature and thus cannot be operated at room temperature.

Polyethylene oxide (PEO)/lithium salt-type electrolytes have been used in solid-state polymer batteries, but still have many problems to be solved from a practical perspective: linear and graft polymers have poor mechanical performance so that self-supported polymer films are not easily manufactured. The ionic conductivity of a network polymer is too low at room temperature. Therefore, such solid-state polymer electrolyte system is only suitable for operating under the condition of elevated temperature or low current, and is difficult to be practically applied at room temperature. An electrochemical window is relatively narrow and is difficult to be compatible with high-voltage cathode material, resulting in relatively low energy density of the solid-state lithium battery.

SUMMARY

The present disclosure provides a polyoxymethylene-based all-solid-state polymer electrolyte prepared by in-situ ring-opening polymerization and an application thereof in forming an all-solid-state secondary lithium battery.

To achieve the above purpose, the present disclosure adopts the following technical solution:

A polyoxymethylene-based all-solid-state polymer electrolyte prepared by in-situ ring-opening polymerization is provided. The all-solid-state polymer electrolyte is formed by that a trioxymethylene monomer, an additive and lithium salt initiates in-situ ring-opening polymerization on a porous support material through a catalyst; and the all-solid-state polymer electrolyte has thickness of 10 μm-800 μm, ionic conductivity of $4\times10^{-5}$ S/cm–$8\times10^{-3}$ S/cm at room temperature and an electrochemical window not lower than 4.2 V.

Mass fraction of the polyoxymethylene polymer in the polymer electrolyte is 20%-40%; mass fraction of the lithium salt in the polymer electrolyte is 5%-20%; mass fraction of the additive in the polymer electrolyte is 5%-25%; mass fraction of the porous support material in the polymer electrolyte is 50%-60%.

Mass fraction of the catalyst in the polymer electrolyte is 0%-5%. A trioxymethylene monomer in the polyoxymethylene polymer has a structure shown in general formula 1:

general formula 1

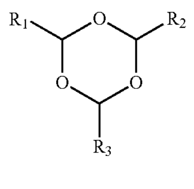

wherein $R_1$, $R_2$ and $R_3$ can be identical or different and selected from —H, —F, —Cl, —Br, —I or —$C_xH_{2x+1}$, wherein a value range of x is 1-5;

the lithium salt is one or more of lithium bis(oxalate) borate, lithium tetrafluoroborate, lithium hexafluorophosphate, lithium difluorophosphate, lithium perchlorate, lithium hexafluoroarsenate, lithium trifluoromethanesulfonate, lithium bis(trifluoromethanesulfonyl)imide, lithium bis(fluorosulfonyl)imide and lithium difluoro(oxalate borate);

a general formula of the additive is NC—$(CH_2)_y$—CN, wherein a value range of y is 1-16;

the catalyst is one or more of lithium difluoro(oxalate borate), lithium tetrafluoroborate, lithium hexafluorophosphate, lithium difluorophosphate, aluminum chloride, ferric chloride, boron trifluoride, boron trifluoride ether complex, phosphorus pentafluoride, niobium pentachloride, titanium tetrachloride, zinc chloride, aluminum trifluoromethanesulfonate, bismuth chloride, perchloric acid, tyrosine, boric acid and acetic acid;

the porous support material is one or more of a polyethylene separator, a polypropylene separator, nylon nonwoven membrane, an alginate fiber non-woven membrane, a cellulose non-woven membrane, bacterial cellulose, glass fiber, a polyethylene terephthalate membrane, a polyimide non-woven membrane, a polyamide membrane, a spandex membrane and an aramid membrane.

When the lithium salt is one or more of lithium difluoro (oxalate borate), lithium tetrafluoroborate, lithium hexafluorophosphate and lithium difluorophosphate, catalyst dosage is 0%; and the lithium salt added at this time can also be used as a catalyst.

The lithium salt is one or more of lithium perchlorate, lithium hexafluoroarsenate, lithium trifluoromethanesulfonate, lithium bis(trifluoromethanesulfonyl)imide, lithium bis(fluorosulfonyl)imide and lithium bis(oxalate) borate, and catalyst dosage is 0.1%-5%.

A preparation method for the polyoxymethylene-based all-solid-state polymer electrolyte prepared by in-situ ring-opening polymerization comprises:

a) uniformly mixing the trioxymethylene monomer and the additive according to a ratio, and then adding the lithium salt and the catalyst for stirring and uniformly mixing;

b) adding the above uniformly mixed mixture on the porous support material;

c) heating the porous support material of the infiltrated mixture for 0.05 h-100 hrs at 40° C.-110° C. to conduct in-situ ring-opening polymerization on the mixture to obtain a polyoxymethylene-based all-solid-state polymer electrolyte.

At a temperature of 40° C.-110° C. in the step a), the trioxymethylene monomer and the additive are stirred for 0.1 h-10 hrs and uniformly mixed; and then the lithium salt and the catalyst are added and stirred for 0.01 h-10 hrs at a temperature of 40° C.-100° C. for uniform mixing to obtain the mixture for later use.

An application of the polyoxymethylene-based all-solid-state polymer electrolyte prepared by in-situ ring-opening polymerization is provided, which is an application of the all-solid-state polymer electrolyte in all-solid-state secondary lithium batteries (all-solid-state lithium ion batteries, all-solid-state lithium metal batteries and all-solid-state lithium-sulfur batteries).

An all-solid-state secondary lithium battery comprises a cathode and an anode, and the all-solid-state polymer electrolyte is between the cathodes and the anodes.

The porous support material of the infiltrated mixture is placed between the cathode and the anode, and heated at 40° C.-110° C. for 0.05 h-100 hrs to conduct in-situ ring-opening polymerization on the mixture to obtain a polyoxymethylene-based all-solid-state polymer electrolyte; the mixture is prepared by uniformly mixing the trioxymethylene monomer and the additive and then adding the lithium salt and the catalyst for stirring and uniformly mixing for later use.

The present disclosure has the following advantages:

The solid-state polymer electrolyte of the present disclosure is prepared by in-situ polymerization through the formation of a room temperature deep eutectic precursor based on a trimethylaldehyde-based monomer and a nitrile-based monomer. The precursor has good solubility for the lithium salt. Moreover, the polyoxymethylene-based all-solid-state polymer electrolyte prepared by in-situ ring-opening polymerization does not require an external catalyst when a specific type of lithium salt is used. The lithium salt is directly used as a catalyst for initiating polymerization for preparation. The catalyst can be further added for further polymerization. The method of the present disclosure is simple and short in time consumption, and has excellent ionic conductivity at room temperature and high electrochemical window.

The solid-state polymer electrolyte of the present disclosure is easy to prepare and simple to form, and has thickness of 10 μm-800 μm, ionic conductivity of $4\times10^{-5}$ S/cm-$8\times10^{-3}$ S/cm at room temperature and an electrochemical window not lower than 4.2 V. Meanwhile, the solid-state electrolyte effectively suppresses the growth of lithium dendrites of the cathode, thereby improving the interfacial stability and long-term cycleperformance. The all-solid-state polymer electrolyte of the present disclosure possesses excellent mechanical performance and high ionic conductivity at room temperature. The all-solid-state polymer electrolyte can match high-voltage cathode materials, thereby effectively improving interfacial stability, long-term cycle performance and energy density.

DETAILED DESCRIPTION

Detailed description of the present disclosure is further illustrated below in combination with examples. It shall be noted that the detailed description described herein is only used to illustrate and explain the present disclosure, not limited to the present disclosure.

In order to solve the problems of potential safety hazards such as easy leakage, easy volatilization, and easy combustion and explosion of the electrolyte in the existing liquid lithium ion battery, and to solve the problem of complex prepare process of a gel polymer electrolyte, the present disclosure provides a polyoxymethylene-based all-solid-state polymer electrolyte prepared by in-situ ring-opening polymerization to improve the comprehensive performance of the existing all-solid-state polymer secondary lithium battery.

Embodiment 1

Figure 1:
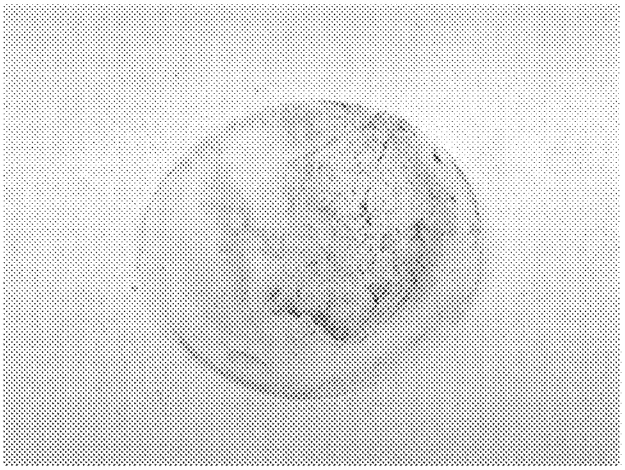
FIG. 1 is a photograph of a polyoxymethylene-based all-solid-state polymer electrolyte prepared by in-situ ring-opening polymerization provided by embodiment 1 of the present disclosure.
Figure 2:
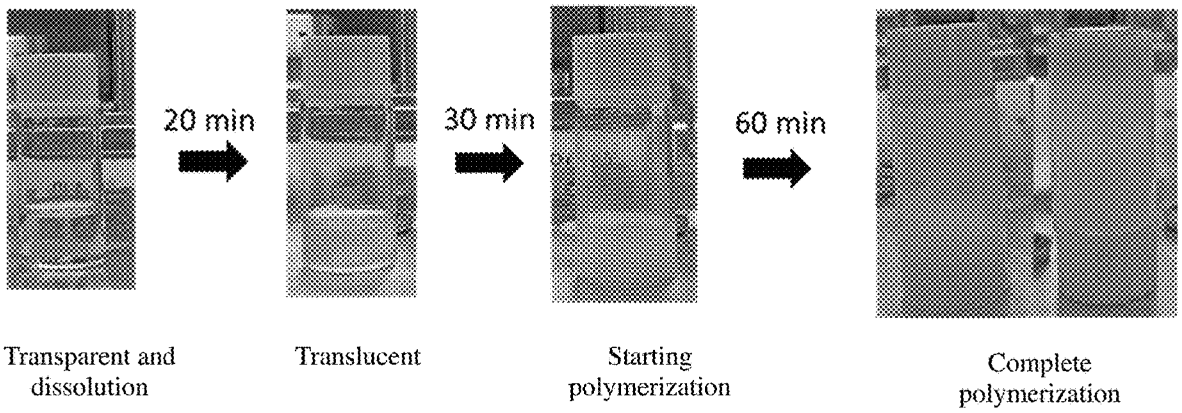
FIG. 2 is a photograph of a polyoxymethylene-based all-solid-state polymer electrolyte prepared by in-situ ring-opening polymerization before and after polymerization provided in embodiment 2 of the present disclosure.

In a glove box filled with argon gas, 4 g of paraldehyde and 1.5 g of succinonitrile are stirred for 5 minutes and mixed uniformly on a heating stage at 60° C., and then 0.375 g of lithium difluoro(oxalate) borate is added, stirred for 10 minutes and mixed uniformly (here, lithium difluoro(oxalate) borate is used as lithium salt and catalyst, without the need of adding an additional catalyst). 0.15 mL of the above mixed precursor is added to cellulose porous support material; then, with $LiCoO_2$ as a cathode and lithium as an anode, the porous support material of the infiltrated mixture is placed between the cathode and the anode; the assembled battery is heated at 60° C. for 2 hrs; and the mixture realizes in-situ polymerization on the porous support material inside the battery to obtain an all-solid-state polymer electrolyte (as shown in FIG. 1), and then to obtain an all-solid-state polymer lithium battery.

It can be seen from FIG. 1 that the formed all-solid-state electrolyte is uniformly attached to a cellulose non-woven separator.

Embodiment 2

In a glove box filled with argon gas, 2.5 g of 1,3,5-trioxane (TXE) and 1.5 g of succinonitrile are stirred for 5 minutes and mixed uniformly on a heating stage at 80° C., and then 0.375 g of lithium difluoro(oxalate borate) is added, stirred for 5 minutes and mixed uniformly (here, lithium difluoro(oxalate borate) is used as lithium salt and catalyst, without the need of adding an additional catalyst). 0.15 mL of the above mixed precursor is added to cellulose porous support material; then, with $LiFePO_4$ as a cathode and lithium as an anode, the porous support material of the infiltrated mixture is placed between the cathode and the anode; the assembled battery is heated at 80° C. for 5 hrs; and the mixture realizes in-situ polymerization on the porous support material inside the battery to obtain an all-solid-state polymer electrolyte.

A battery cycle test is carried out by the above all-solid-state polymer lithium battery. A battery charge-discharge voltage range is 2.75 V-4 V, a charge-discharge rate is 0.3 C, and test temperature is room temperature (as shown in FIG. 3).

Figure 3:
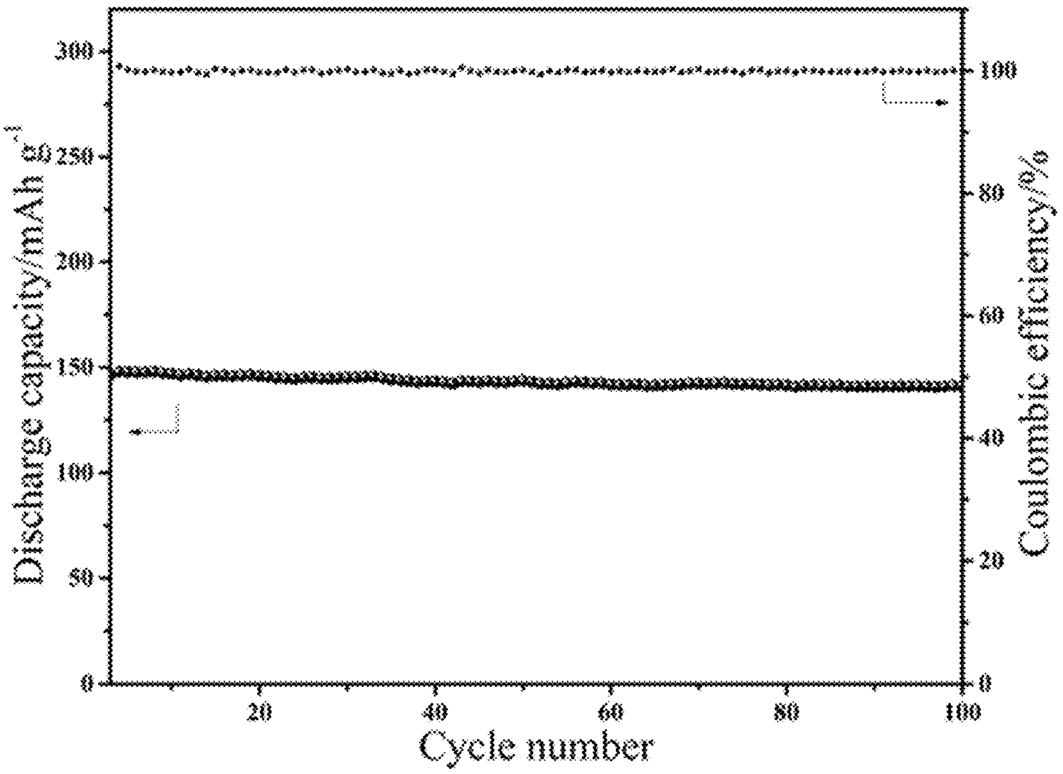
FIG. 3 is a long-term cycle performance of a lithium iron phosphate/lithium metal battery assembled with a polyoxymethylene-based all-solid-state polymer electrolyte provided in embodiment 2 of the present disclosure.

It can be seen from FIG. 3 that the all-solid-state polymer lithium battery exhibits excellent cycling stability when matched with the lithium iron phosphate cathode and the lithium anode, and still deliver a high capacity retention (97%) after 100 cycles.

Embodiment 3

In a glove box filled with argon gas, 2.5 g of 1,3,5-trioxane (TXE) and 2.5 g of succinonitrile are stirred for 10 minutes and mixed uniformly on a heating stage at 80° C., and then 0.375 g of lithium difluoro(oxalate borate) is added, stirred for 5 minutes and mixed uniformly (here, lithium difluoro(oxalate borate) is used as lithium salt and catalyst, without the need of adding an additional catalyst). 0.15 mL of the above mixed precursor is added to cellulose porous support material; then, with ternary material as a cathode and lithium as an anode, the porous support material of the infiltrated mixture is placed between the cathode and the anode; the assembled battery is heated at 80° C. for 5 hrs; and the mixture realizes in-situ polymerization on the porous support material inside the battery to obtain an all-solid-state polymer electrolyte.

A battery cycle test is carried out by the above all-solid-state polymer lithium battery. A battery charge-discharge voltage range is 2.75 V-4.3 V, a charge-discharge rate is 0.2 C, and test temperature is room temperature (as shown in FIG. 4).

Figure 4:
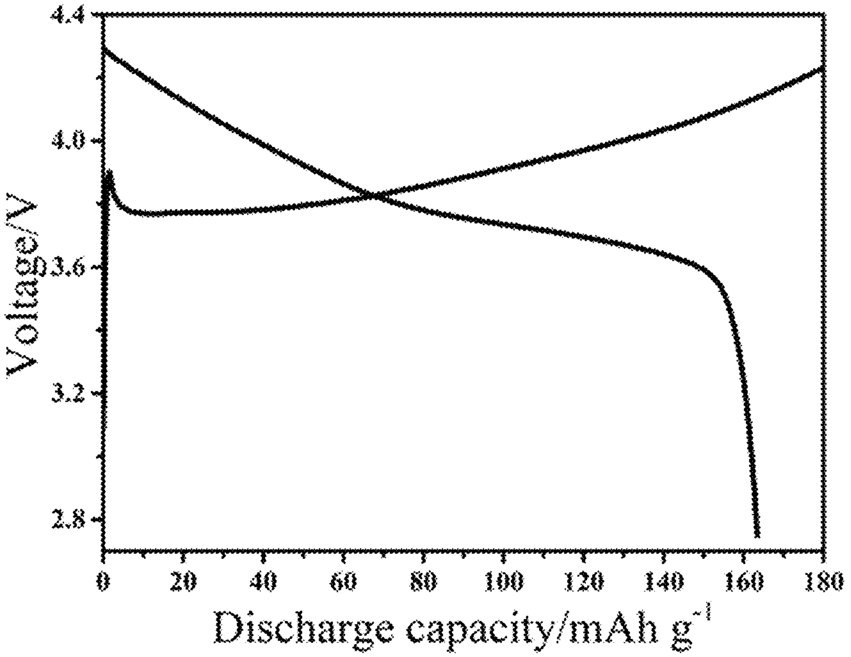
FIG. 4 is a charge/discharge curves of a ternary cathode material (NCM622)/lithium metal battery assembled with a polyoxymethylene-based all-solid-state polymer electrolyte provided in embodiment 3 of the present disclosure.

It can be seen in FIG. 4 that the specific discharge capacity of the all-solid-state polymer lithium battery at room temperature when matched with the ternary cathode material (NCM622) and the lithium anode is 162 mAh/g, which proves that the all-solid-state electrolyte has excellent interfacial compatibility with the ternary material and lithium and has high ionic conductivity at room temperature.

Embodiment 4

In a glove box filled with argon gas, 4 g of 1,3,5-trioxane (TXE) and 1.5 g of malononitrile are stirred for 20 minutes and mixed uniformly on a heating stage at 40° C., and then 0.4 g of lithium hexafluorophosphate is added, stirred for 2 minutes and mixed uniformly (here, lithium hexafluorophosphate is used as lithium salt and catalyst, without the need of adding an additional catalyst). 0.15 mL of the above mixed precursor is added to cellulose porous support material; then, with $LiFePO_4$ as a cathode and graphite as an anode, the porous support material of the infiltrated mixture is placed between the cathode and the anode; the assembled battery is heated at 40° C. for 24 hrs; and the mixture realizes in-situ polymerization on the porous support material inside the battery to obtain an all-solid-state polymer electrolyte, and then to obtain an all-solid-state polymer lithium battery.

Embodiment 5

In a glove box filled with argon gas, 2.5 g of 1,3,5-trioxane (TXE) and 2.4 g of succinonitrile are stirred for 40 minutes and mixed uniformly on a heating stage at 50° C., and then 0.375 g of lithium difluoro(oxalate borate) is added, stirred for 5 minutes and mixed uniformly (here, lithium difluoro(oxalate borate) is used as lithium salt and catalyst, without the need of adding an additional catalyst). 0.4 mL of the above mixed precursor is added to glass fiber porous support material; then, with ternary cathode material as a cathode and graphite as an anode, the porous support material of the infiltrated mixture is placed between the cathode and the anode; the assembled battery is heated at 50° C. for 10 hrs; and the mixture realizes in-situ polymerization on the porous support material inside the battery to obtain an all-solid-state polymer electrolyte, and then to obtain an all-solid-state polymer lithium battery.

Embodiment 6

In a glove box filled with argon gas, 4 g of 1,3,5-trioxane (TXE) and 1.5 g of succinonitrile are stirred for 15 minutes and mixed uniformly on a heating stage at 60° C., and then 0.7 g of lithium tetrafluoroborate is added, stirred for 6 minutes and mixed uniformly (here, lithium tetrafluoroborate is used as lithium salt and catalyst, without the need of adding an additional catalyst). 0.4 mL of the above mixed precursor is added to a polyethylene terephthalate membrane porous support material; then, with $LiFePO_4$ as a cathode and lithium as an anode, the porous support material of the infiltrated mixture is placed between the cathode and the anode; the assembled battery is heated at 60° C. for 0.5 h; and the mixture realizes in-situ polymerization on the porous support material inside the battery to obtain an all-solid-state polymer electrolyte, and then to obtain an all-solid-state polymer lithium battery.

Embodiment 7

In a glove box filled with argon gas, 4 g of 1,3,5-trioxane (TXE) and 1.5 g of glutaronitrile are stirred for 25 minutes and mixed uniformly on a heating stage at 40° C., and then 0.375 g of lithium difluoro(oxalate borate) is added, stirred for 10 minutes and mixed uniformly (here, lithium difluoro (oxalate borate) is used as lithium salt and catalyst, without the need of adding an additional catalyst). 0.2 mL of the above mixed precursor is added to cellulose porous support material; then, with sulphur as a cathode and lithium as an anode, the porous support material of the infiltrated mixture is placed between the cathode and the anode; the assembled battery is heated at 40° C. for 1 h;

and the mixture realizes in-situ polymerization on the porous support material inside the battery to obtain an all-solid-state polymer electrolyte, and then to obtain an all-solid-state polymer lithium battery.

Embodiment 8

In a glove box filled with argon gas, 2.5 g of 1,3,5-trioxane (TXE) and 2.5 g of succinonitrile are stirred for 5 minutes and mixed uniformly on a heating stage at 80° C., and then 0.735 g of lithium difluoro(oxalate borate) is added, stirred for 10 minutes and mixed uniformly (here, lithium difluoro(oxalate borate) is used as lithium salt and catalyst, without the need of adding an additional catalyst). 0.10 mL of the above mixed precursor is added to cellulose porous support material; then, with $LiCoO_2$ as a cathode and lithium as an anode, the porous support material of the infiltrated mixture is placed between the cathode and the anode; the assembled battery is heated at 80° C. for 2 hrs; and the mixture realizes in-situ polymerization on the porous support material inside the battery to obtain an all-solid-state polymer electrolyte, and then to obtain an all-solid-state polymer lithium battery.

A battery cycle test is carried out by the above all-solid-state polymer lithium battery. A battery charge-discharge voltage range is 3 V-4.3 V, a charge-discharge rate is 0.3 C, and test temperature is room temperature (as shown in FIG. 5).

Figure 5:
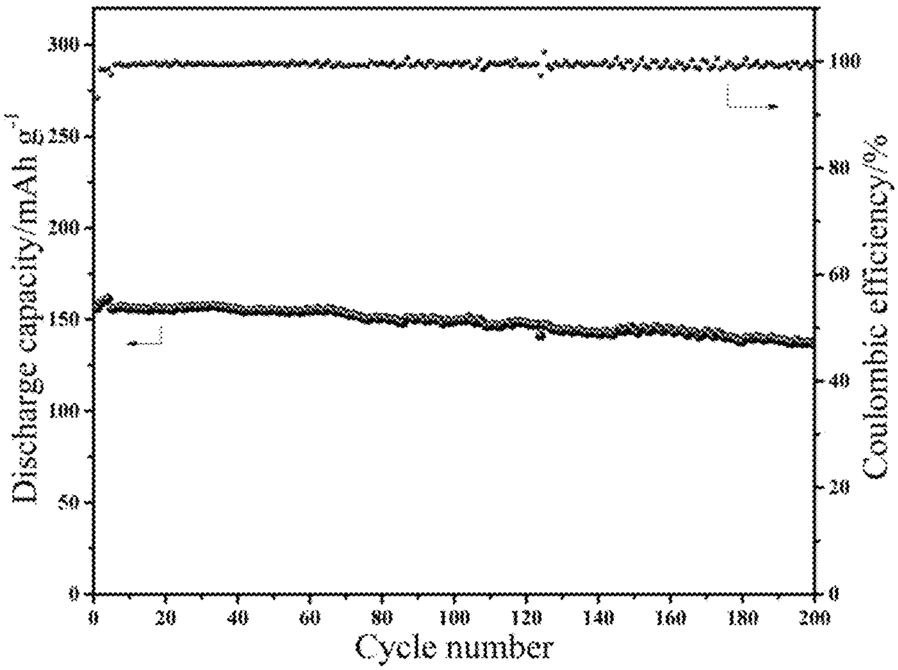
FIG. 5 is a long-term cycle performance of a lithium cobalt oxide/lithium metal battery assembled with a polyoxymethylene-based all-solid-state polymer electrolyte provided in embodiment 8 of the present disclosure.

It can be seen from FIG. 5 that the all-solid-state polymer lithium battery exhibits excellent cycling stability when matched with 4.3 V lithium cobalt oxide cathode and lithium anode, and still deliver a high capacity retention (93%) after 100 cycles.

Embodiment 9

In a glove box filled with argon gas, 1 g of 1,3,5-trioxane (TXE) and 2 g of succinonitrile are stirred for 15 minutes and mixed uniformly on a heating stage at 40° C., and then 0.1 g of lithium hexafluorophosphate (as a catalyst) and 0.4 g of lithium bis(oxalate)borate are added, stirred for 10 minutes and mixed uniformly. 0.15 mL of the above mixed precursor is added to cellulose porous support material; then, with $LiCoO_2$ as a cathode and graphite as an anode, the porous support material of the infiltrated mixture is placed between the cathode and the anode; the assembled battery is heated at 80° C. for 1 h; and the mixture realizes in-situ polymerization on the porous support material inside the battery to obtain an all-solid-state polymer electrolyte, and then to obtain an all-solid-state polymer lithium battery.

Embodiment 10

In a glove box filled with argon gas, 2.5 g of 1,3,5-trioxane (TXE) and 1.5 g of succinonitrile are stirred for 5 minutes and mixed uniformly on a heating stage at 110° C., and then 0.1 g of lithium hexafluorophosphate (as a catalyst) and 0.4 g of lithium bis(oxalate)borate are added, stirred for 10 minutes and mixed uniformly. 0.15 mL of the above mixed precursor is added to cellulose porous support material; then, with $LiCoO_2$ as a cathode and graphite as an anode, the porous support material of the infiltrated mixture is placed between the cathode and the anode; the assembled battery is heated at 100° C. for 0.5 h; and the mixture realizes in-situ polymerization on the porous support material inside the battery to obtain an all-solid-state polymer electrolyte, and then to obtain an all-solid-state polymer lithium battery.

Embodiment 11

In a glove box filled with argon gas, 1.5 g of 1,3,5-trioxane (TXE) and 1.2 g of adiponitrile are stirred for 30 minutes and mixed uniformly on a heating stage at 20° C., and then 0.4 g of lithium bis(trifluoromethanesulfonyl)imide and 0.1 g of boron trifluoride ether complex are added, stirred for 50 minutes and mixed uniformly. 0.2 mL of the above mixed precursor is added to a bacterial cellulose porous support material; then, with high nickel NCM9055 as a cathode and lithium metal as an anode, the porous support material of the infiltrated mixture is placed between the cathode and the anode; the assembled battery is heated at 60° C. for 5 hrs; and the mixture realizes in-situ polymerization on the porous support material inside the battery to obtain an all-solid-state polymer electrolyte, and then to obtain an all-solid-state polymer lithium battery.

A battery cycle test is carried out by the above all-solid-state polymer lithium battery. A battery charge-discharge voltage range is 3 V-4.3 V, a charge-discharge rate is 1 C, and test temperature is room temperature (as shown in FIG. 6).

Figure 6:
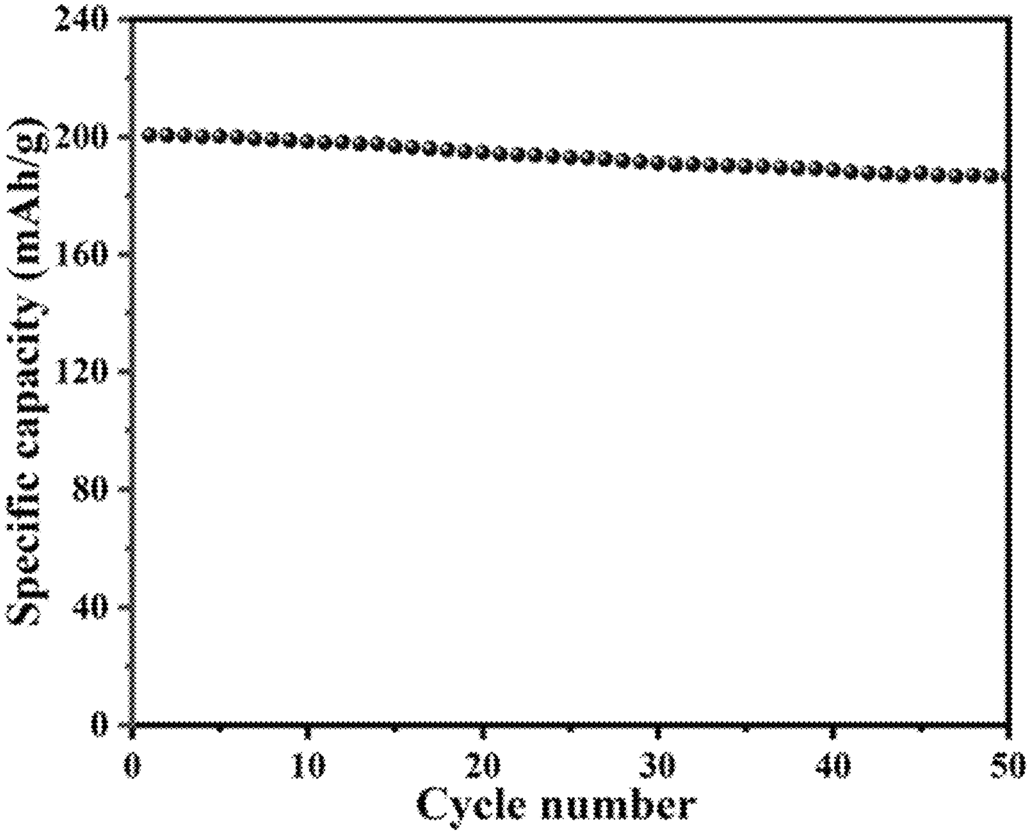
FIG. 6 is a long-term cycle performance of a high nickel NCM9055/lithium metal battery assembled with a polyoxymethylene-based all-solid-state polymer electrolyte provided in embodiment 11 of the present disclosure.

It can be seen from FIG. 6 that the all-solid-state polymer lithium battery exhibits excellent cycling stability when matched with 4.3 V high nickel NCM9055 cathode and lithium anode, and still exhibits a high capacity retention (93%) after 50 cycles.

Embodiment 12

In a glove box filled with argon gas, 5 g of 1,3,5-trioxane (TXE) and 3 g of succinonitrile are stirred for 60 minutes and mixed uniformly on a heating stage at 50° C., and then 0.1 g of lithium bis(trifluoromethanesulfonyl)imide and 0.1 g of lithium trifluoromethanesulfonate are added, stirred for 30 minutes and mixed uniformly. 0.1 g of phosphorus pentafluoride is added, stirred for 50 minutes and mixed uniformly. 0.2 mL of the above mixed precursor is added to a cellulose porous support material; then, with NCM811 as a cathode and lithium metal as an anode, the porous support material of the infiltrated mixture is placed between the cathode and the anode; the assembled battery is heated at 70° C. for 3 hrs; and the mixture realizes in-situ polymerization on the porous support material inside the battery to obtain an all-solid-state polymer electrolyte, and then to obtain an all-solid-state polymer lithium battery.

The invention claimed is:

1. An all-solid-state polymer electrolyte, comprising a polyoxymethylene polymer supported on a porous support, wherein the polyoxymethylene polymer is prepared by in-situ ring-opening polymerization of a trioxymethylene monomer in the presence of an additive, a lithium salt, and optionally in the presence of a catalyst, wherein the all-solid-state polymer electrolyte has thickness of 10 μm-800 μm, an ionic conductivity of $4\times10^{-5}$ S/cm-$8\times10^{-3}$ S/cm at room temperature, and an electrochemical window not lower than 4.2 V, wherein the trioxymethylene monomer is of general formula 1:

general formula 1

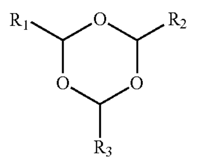

wherein $R_1$, $R_2$, and $R_3$ is identical or different and are selected from —H, —F, —Cl, —Br, —I, and —$C_xH_{2x+1}$, x being 1-5, the lithium salt is one or more selected from lithium bis(oxalate) borate, lithium tetrafluoroborate, and lithium difluorophosphate, the additive is NC—$(CH_2)_y$—CN, a value range of y being 1-16, the optional catalyst is one or more selected from ferric chloride, niobium pentachloride, titanium tetrachloride, zinc chloride, bismuth chloride, perchloric acid, tyrosine, boric acid, and acetic acid, and the porous support is a polyethylene separator, a polypropylene separator, nylon non-woven membrane, an alginate fiber non-woven membrane, a cellulose non-woven membrane, bacterial cellulose, glass fiber, a polyethylene terephthalate membrane, a polyimide non-woven membrane, a polyamide membrane, a spandex membrane, or an aramid membrane, and wherein a mass fraction of the polyoxymethylene polymer in the polymer electrolyte is 20%-40%; a mass fraction of the lithium salt in the polymer electrolyte is 5%-20%; a mass fraction of the additive in the polymer electrolyte is 5%-25%; a mass fraction of the porous support in the polymer electrolyte is 50%-60%; and a mass fraction of the catalyst in the polymer electrolyte is less than 5%, and the polymerization of the trioxymethylene monomer is carried out without a solvent to form the all-solid-state electrolyte.

2. An all-solid-state secondary lithium battery, comprising the all-solid-state polymer electrolyte according to claim 1, wherein the all-solid-state secondary lithium battery is an all-solid-state lithium ion battery, an all-solid-state lithium metal battery, or an all-solid-state lithium-sulfur battery.

3. The all-solid-state secondary lithium battery of claim 2, further comprising a cathode or an anode, wherein the all-solid-state polymer electrolyte according is disposed between the cathode and the anode.

4. A preparation method for the all-solid-state polymer electrolyte according to claim 1, comprising a) uniformly mixing the trioxymethylene monomer and the additive according to a ratio, and then adding the lithium salt and the optional catalyst to obtain a mixture;

b) adding the mixture on the porous support;

and c) heating the porous support carrying the mixture for 0.05 h-100 hrs at 40° C.-110° C. to conduct in-situ ring-opening polymerization to obtain the all-solid-state polymer electrolyte.

5. The preparation method according to claim 4, wherein under the condition of 40° C.-110° C. in the step a), the trioxymethylene monomer and the additive are stirred for 0.1 h-10 hrs and uniformly mixed; and then the lithium salt and the catalyst are added and stirred for 0.01 h-10 hrs under the condition of 40° C.-100° C. for uniform mixing to obtain the mixture for later use.

6. The method according to claim 4, comprising placing the porous support carrying the mixture between the cathode and the anode prior to the heating step.

* * * * *